United States Patent
Kang et al.

(10) Patent No.: US 8,396,324 B2
(45) Date of Patent: Mar. 12, 2013

(54) IMAGE PROCESSING METHOD AND APPARATUS FOR CORRECTING DISTORTION CAUSED BY AIR PARTICLES AS IN FOG

(75) Inventors: Bong-hyup Kang, Changwon (KR); Dong-jun Kim, Seoul (KR); Chang-won Jeon, Seoul (KR); Hanseok Ko, Seoul (KR)

(73) Assignees: Samsung Techwin Co., Ltd., Changwon (KR); Korea University Industrial & Academic Collaboration Foundation, Seoul (KR)

( * ) Notice: Subject to any disclaimer, the term of this patent is extended or adjusted under 35 U.S.C. 154(b) by 939 days.

(21) Appl. No.: 12/436,885

(22) Filed: May 7, 2009

(65) Prior Publication Data

US 2010/0040300 A1 Feb. 18, 2010

(30) Foreign Application Priority Data

Aug. 18, 2008 (KR) .................. 10-2008-0080558
Nov. 11, 2008 (KR) .................. 10-2008-0111875

(51) Int. Cl.
*G06K 9/40* (2006.01)
*H04N 5/00* (2011.01)

(52) U.S. Cl. ........ 382/275; 382/254; 382/255; 382/260; 382/263; 382/266; 382/274; 348/607

(58) Field of Classification Search .............. 382/254, 382/255, 260, 263, 266, 274, 275
See application file for complete search history.

(56) References Cited

U.S. PATENT DOCUMENTS

| | | | |
|---|---|---|---|
| 6,462,768 B1 * | 10/2002 | Oakley | 348/31 |
| 6,724,943 B2 * | 4/2004 | Tsuchiya et al. | 382/261 |
| 7,889,916 B2 * | 2/2011 | Miyaki | 382/162 |
| 8,098,890 B2 * | 1/2012 | Haseyama | 382/103 |
| 2008/0112641 A1 * | 5/2008 | Oakley | 382/274 |
| 2008/0170754 A1 * | 7/2008 | Kawasaki | 382/104 |
| 2011/0043603 A1 * | 2/2011 | Schechner et al. | 348/25 |

OTHER PUBLICATIONS

Edmonson et al., "Automatic Correction for Atmospheric Degradation in Infrared Images", RTO Set Symposium on "E-0 Propagation, Signature and System Performance under Adverse Meteorogical Conditions considering Out-of-Area Operations", Italian Air Force Academy, Naples, Italy, Mar. 16-19, 1998, pp. 9-1-9-7.*
Oakley et al., "Correction of Simple Contrast Loss in Color Images", IEEE Transactions on Image Processing, vol. 16 No. 2, Feb. 2, 2007, pp. 511-522.*
Zhai et al., "An Improved Fog-Degraded Image Enhancement Algorithm", IEEE Proceedings of the 2007 International Conference on Wavelet Analysis and Pattern Recognition, 2007, pp. 522-526.*

(Continued)

*Primary Examiner* — Matthew Bella
*Assistant Examiner* — Jose M Torres
(74) *Attorney, Agent, or Firm* — Drinker Biddle & Reath LLP

(57) ABSTRACT

Provided are a method and apparatus for processing an image. The method includes receiving a first luminance image of an image including airlight, which is a type of light that occurs in a foggy environment, and generating an airtight map based on a ratio between an average luminance of the first luminance image, and a standard deviation; and removing the airtight by subtracting the airtight map from the first luminance image and outputting a second luminance image. According to the present invention, airlight components may be effectively removed.

30 Claims, 19 Drawing Sheets

OTHER PUBLICATIONS

Narasimjan et al., "Shedding Light on the Weather", IEEE Proceedings of the 2003 IEEE Computer Society Conference on Computer Vision and Pattern Recognition, 2003, pp. I-665-I-672.*

Hautiere et al., "Towards Fog-Free In-Vehicle Vision Systems through Contrast Restoration", IEEE Conference on Computer Vision and Pattern Recognition, 2007, pp. 1-8.*

Kim et al., "Enhancement of Image Degraded by Fog Using Cost Function Based on Human Vision Model", IEEE International Conference on Multisensor Fusion and Integration for Intelligent Systems, 2008, pp. 64-67.*

Narasimhan et al., "Contrast Restoration of Weather Degraded Images," IEEE Transactions on Pattern Analysis and Machine Intelligence, vol. 25 (6), pp. 713-724 (Jun. 2003).

Oakley et al., "Correction of Simple Contrast Loss in Color Images," IEEE Transactions on Image Processing, vol. 16 (2), pp. 511-522 (Feb. 2007).

* cited by examiner

IMAGE PROCESSING METHOD AND APPARATUS FOR CORRECTING DISTORTION CAUSED BY AIR PARTICLES AS IN FOG

CROSS-REFERENCE TO RELATED PATENT APPLICATION

This application claims the benefits of Korean Patent Application No. 10-2008-0080558, filed on Aug. 18, 2008, and Korean Patent Application No. 10-2008-0111875, filed on Nov. 11, 2008, in the Korean Intellectual Property Office, the disclosures of which are incorporated herein in their entirety by reference.

BACKGROUND OF THE INVENTION

1. Field of the Invention

The present invention relates to image processing, and more particularly, to an image processing method and apparatus for enhancing an image by correcting a distortion caused by fog in a foggy environment.

2. Description of the Related Art

Fog comprises droplets of water vapor suspended in air near the Earth's surface. Generally, visual impairment occurs in fog such that a visual range is reduced to below 1 km. When there is fog, water particles are generated in the air and light is scattered due to the water particles. Light scattering refers to a phenomenon in which light strikes particles in the air and thus, the light changes its path, and looks different according to the waveform of light and the sizes of the particles.

In general, light scattering is mainly modeled as either Rayleigh or Mie scattering. Rayleigh scattering models are applied when particles causing light scattering are much smaller in diameter than the wavelength of light and, in this case, scattering energy is inversely proportional to the wavelength to the power of four ($\lambda^4$). For example, when light is scattered due to air molecules on a sunny day, blue light is scattered more than red light, and the sky looks blue. However, in some cases particles causing light scattering are much larger in diameter than the waveform of light. In such cases, Mie scattering models are applied. Water particles in fog, which have diameters of several to several ten μm, are larger than the wavelength of visual light, which is about 400 to 700 nm and thus Mie scattering models are applied to fog. According to Mie scattering models, when particles causing light scattering, such as water particles, are large, scattering is less influenced by the wavelength, and every wavelength of light in the visual spectrum is scattered by almost the same amount. Thus, subjects look blurred in fog. In this case, a type of light, which occurs in a foggy environment, is generated and hereinafter will be referred to as airlight.

Image enhancement achieved by performing fog distortion correction can solve a problem of visual impairment, can make a blurred image clear, and is important as a pre-process procedure for recognition by restoring information regarding text, objects, etc., which is obscured due to fog.

An existing method of removing fog from an image is mainly segmented into a non-modeling method and a modeling method. An example of the non-modeling method is a histogram equalization method that redistributes luminance values of an image by analyzing a histogram of the image. However, despite being easy to perform and having good image enhancement characteristics, the histogram equalization method is not appropriate for a foggy image which has a non-uniform depth. Also, the histogram equalization method is appropriate for enhancing a general image but cannot sufficiently reflect the influence of fog on an image. Thus, a thick foggy image can only be slightly enhanced by using the histogram equalization method.

The modeling method uses data obtained by modeling the influence of light scattering caused by fog, on an image. A method of correcting a distortion caused by fog by estimating a scene depth by comparing two or more images obtained in different weather conditions, and correcting the scene depth, is disclosed in "Contrast restoration of weather degraded images" by S. G. Narasimhan and S. K. Nayar in IEEE Transactions on Pattern Analysis and Machine Intelligence, vol. 25, pp. 713-724, 2003. However, in the above method, two or more images obtained in different weather conditions should be input and thus, for real-time implementation, changes in weather conditions have to be sensed and also a space for storing images is required. Furthermore, a cycle of weather changes cannot be predicted and thus an image storing cycle cannot be easily determined. In addition, completely identical scenes have to be photographed and thus, if a moving subject exists, an error can occur when a distortion caused by fog is estimated.

A method of correcting distortion caused by fog by estimating pixel values of an image, which vary due to fog, and subtracting the pixel values from the image, is disclosed in "Correction of Simple Contrast Loss in Color Images" by J. P. Oakley and H. Bu in IEEE Transactions on Image Processing, vol. 16, pp. 511-522, 2007. The above method is performed on the assumption that fog is uniform, and thus can be applied to only uniform and thin fog. However, fog is not uniform in most cases and, even when fog is uniform, a degree of influence of fog varies based on the distance between a camera and a subject. Thus, the above method cannot be easily applied to actual cases.

SUMMARY OF THE INVENTION

The present invention provides an image processing method and apparatus for enhancing an image by effectively estimating and removing fog components from a foggy image.

According to an aspect of the present invention, there is provided an image processing method including receiving a first luminance image of an image including airlight and generating an airlight map based on a ratio between an average luminance of the first luminance image, and a standard deviation; and removing the airlight by subtracting the airtight map from the first luminance image and outputting a second luminance image.

The airlight map may represent a degree of influence of the airtight on the image.

The generating of the airtight map may include segmenting the first luminance image into a predetermined number of regions; defining a cost function by using the ratio between the average luminance of the first luminance image, and the standard deviation, with respect to each region, and calculating an airtight component of each region by using the cost function; and generating the airtight map of the first luminance image by performing a least squares method on airtight components of the regions.

The segmenting of the first luminance image may be adaptively performed based on a depth difference of the first luminance image.

The segmenting of the first luminance image may include summing gradient values in row and column directions of the first luminance image and segmenting the first luminance image with reference to coordinates having maximum sums of the gradient values.

The method may further include detecting a sky region by using edge information of the first luminance image before segmenting the first luminance image.

The method may further include performing pre-processing on the first luminance image by extending a luminance representation range of a non-sky region obtained by excluding the sky region from the first luminance image, adjusting luminance of the non-sky region by using a histogram, and generating a mapping function which represents the luminance representation range, by accumulating values of the histogram.

The performing of pre-processing may include adjusting the luminance according to Equation 7.

$$h_{new}(k)=(h(k)+1)^{1/n} \qquad (7)$$

(Here, h(k) represents a histogram, k represents a luminance representation range, and n represents a constant of an exponent.)

The mapping function may maintain the luminance representation range of the sky region.

The cost function may be defined as Equation 2.

$$A(\lambda) = \left[\frac{STD(Y'(i,j)-\lambda)}{MEAN(Y'(i,j)-\lambda)}\right] \qquad (2)$$

$$B(\lambda) = \left[\frac{MEAN(Y'(i,j)-\lambda)}{MEAN(I(i,j))}\right] \times \left[\frac{STD(I(i,j))}{MEAN(I(i,j))}\right]$$

$$= [(MEAN(Y'(i,j)-\lambda)] \times \left[\frac{STD(I(i,j))}{MEAN(I(i,j))^2}\right]$$

(Here, Y'(i,j) represents a luminance component of an image including airlight, I(i,j) represents a luminance component of an image not including airlight, (i,j) is a coordinate of a pixel, and A is a degree of luminance to be subtracted from an image.)

The airlight component may be calculated according to Equation 3.

$$\lambda_{Y(i,j)}=\arg\min(|A(\lambda)-B(\lambda)|) \qquad (3)$$

The method may further include performing edge enhancement on the second luminance image.

Edge enhancement may be performed according to Equation 5.

$$Y_{out(i,j)}=Y'(i,j)\pm s\times g(i,j). \qquad (5)$$

(Here, $Y_{out(i,j)}$ represents a luminance image on which fog distortion correction and edge enhancement are performed, s represents a parameter for controlling a degree of edge enhancement, and g(i,j) represents an edge component that is passed through a high pass filter.)

The method may further include converting a chrominance image of the image including the airlight, and a third luminance image obtained by performing edge enhancement on the second luminance image, into an RGB image; and performing histogram stretching on the RGB image.

The method may further include performing post-processing by compensating for luminance reduction in the second luminance image.

The method may further include compensating for saturation reduction caused by a luminance variation of the image including the airlight by using the first luminance image and a first chrominance image of the image, and by using the second luminance image on which post-processing is performed.

The airtight may be a type of light that occurs in a foggy environment.

According to another aspect of the present invention, there is provided an image processing method including receiving a first luminance image of an image including a foggy image and segmenting the first luminance image into a predetermined number of regions; calculating an airlight component of each region based on a ratio between an average luminance of the first luminance image, and a standard deviation; generating an airtight map of the first luminance image by performing a least squares method on airtight components of the regions; and removing an influence of the foggy image by subtracting the airtight map from the first luminance image and outputting a second luminance image.

The segmenting of the first luminance image may be adaptively performed based on a depth difference of the first luminance image.

Before segmenting the first luminance image, the method may further include detecting a sky region by using edge information of the first luminance image; and performing pre-processing on the first luminance image by adjusting luminance of a non-sky region obtained by excluding the sky region from the first luminance image, and the segmenting of the first luminance image may be adaptively performed based on depth information of the first luminance image on which pre-processing is performed.

The airtight may be a type of light that occurs in a foggy environment.

According to another aspect of the present invention, there is provided an image processing apparatus including an airtight map generator for receiving a first luminance image of an image including airtight and generating an airtight map based on a ratio between an average luminance of the first luminance image, and a standard deviation; and a subtracter for removing the airtight by subtracting the airtight map from the first luminance image and outputting a second luminance image.

The airlight map may represent a degree of influence of the airtight on the image.

The airlight map generator may include an region segmentor for segmenting the first luminance image into a predetermined number of regions; an airtight calculator for defining a cost function by using the ratio between the average luminance of the first luminance image, and the standard deviation, with respect to each region, and calculating an airtight component of each region by using the cost function; and a map generator for generating the airtight map of the first luminance image by performing a least squares method on airtight components of the regions.

The apparatus may further include an edge enhancer for performing edge enhancement on the second luminance image output from the subtracter.

The apparatus may further include an RGB converter for converting a chrominance image of the image including the airlight, and a third luminance image output from the edge enhancer, into an RGB image; and a post-processor for performing histogram stretching on the RGB image.

The region segmentor may adaptively segment the first luminance image based on a depth difference of the first luminance image.

The apparatus may further include a sky region detector for detecting a sky region by using edge information of the first luminance image.

The apparatus may further include a pre-processor for extending a luminance representation range of a non-sky region obtained by excluding the sky region from the first luminance image, adjusting luminance of the non-sky region by using a histogram, and generating a mapping function which represents the luminance representation range, by accumulating values of the histogram.

The apparatus may further include a post-processor for compensating the second luminance image for luminance reduction.

The apparatus may further include a chrominance compensator for compensating for saturation reduction caused by a luminance variation of the image including the airlight by using the first luminance image and a first chrominance image of the image, and the second luminance image on which post-processing is performed.

The airlight may be a type of light that occurs in a foggy environment.

According to another aspect of the present invention, there is provided a computer readable recording medium having recorded thereon a computer program for executing each of the above methods.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings. In the following description of the present invention, only essential parts for understanding operation of the present invention will be described and other parts may be omitted in order not to make the subject matter of the present invention unclear.

Also, the terms used in the specification and the claims should not be limited to conventional or lexical meanings and should be construed as having meanings and concepts corresponding to the technical idea of the present invention in order to more appropriately describe the present invention.

Figure 1:
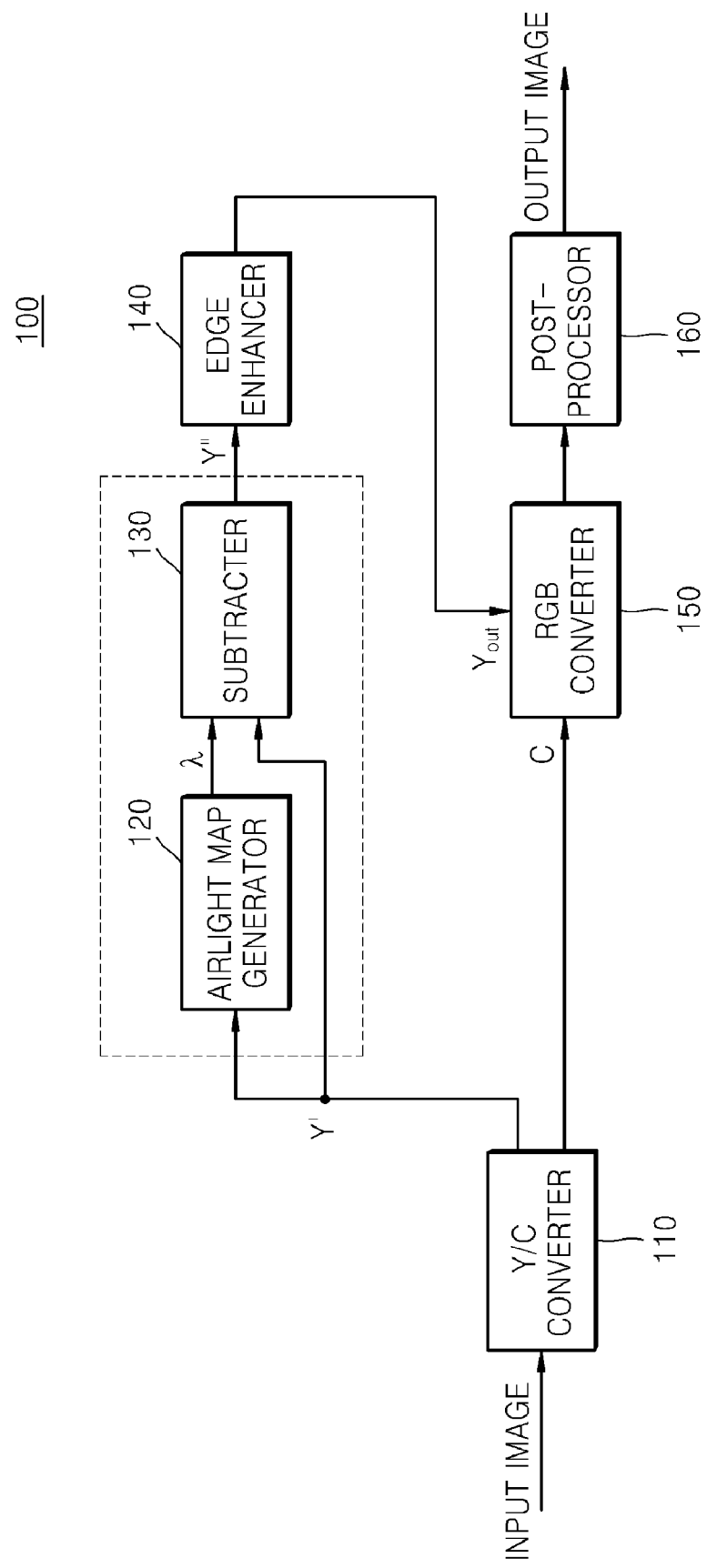
FIG. 1 is a block diagram of an image processing apparatus according to an embodiment of the present invention.

FIG. 1 is a block diagram of an image processing apparatus 100 according to an embodiment of the present invention.

Referring to FIG. 1, the image processing apparatus 100 includes a Y/C converter 110, an airlight map generator 120, a subtracter 130, an edge enhancer 140, an RGB converter 150, and a post-processor 160. Alternatively, the image processing apparatus 100 may include only the airtight map generator 120 and the subtracter 130.

The Y/C converter 110 converts an input RGB image to a YCbCr color space and outputs a luminance image Y and a chrominance image C. Here, the RGB image includes airlight components and airlight is generated due to fog in the air. Also, the RGB image is blurred and has unclear colors, due to fog. That is, the RGB image is damaged due to the influence of the airtight generated when light strikes fog particles in the air in a foggy environment. In this case, the airtight is generated due to fog and acts as a new type of light source.

Here, conversion from an RGB color space to the YCbCr color space is performed by using Equation 1.

$$Y = 0.29900R + 0.58700G + 0.11400B$$

$$Cb = -0.16874R - 0.33126G + 0.50000B$$

$$Cr = 0.50000R - 0.41869G - 0.08131B \quad (1)$$

Here, the luminance image Y represents a degree of brightness and the chrominance image C represents color information. The chrominance image C includes a chrominance-blue image Cb that represents a difference between a blue (B) image and a reference value and a chrominance-red image Cr that represents a difference between a red (R) image and the reference value. According to the current embodiment of the present invention, complexity is reduced by using a YCbCr image in comparison to a case when an RGB image is used. Also, since human eyes are sensitive to variations in brightness more than to variations in color, only a luminance image is used. In particular, due to the human sensitivity to luminance, the YCbCr color space separates luminance components from color information by using human vision characteristics. Although the current embodiment of the present invention is representatively described with respect to a case when an RGB image is converted into a YCbCr image, the same principal may be applied to other color spaces such as YUV, Lab, and YCC color spaces, as well as the YCbCr color space.

The airlight map generator 120 receives a first luminance image Y' of an image including the airlight and generates an airlight map based on a ratio between an average luminance of the first luminance image Y', and a standard deviation. Here, the ratio of the average luminance and the standard deviation is used in consideration of the influence of the airlight, more particularly, the airtight generated due to fog, on the image.

FIGS. 3A through 3D are diagrams for describing influence of airtight generated due to fog, on luminance of an image, according to an embodiment of present invention.

Figure 3A:
FIGS. 3A through 3D are diagrams for describing the influence of airtight generated due to fog, on the luminance of an image, according to an embodiment of present invention.
Figure 3B:
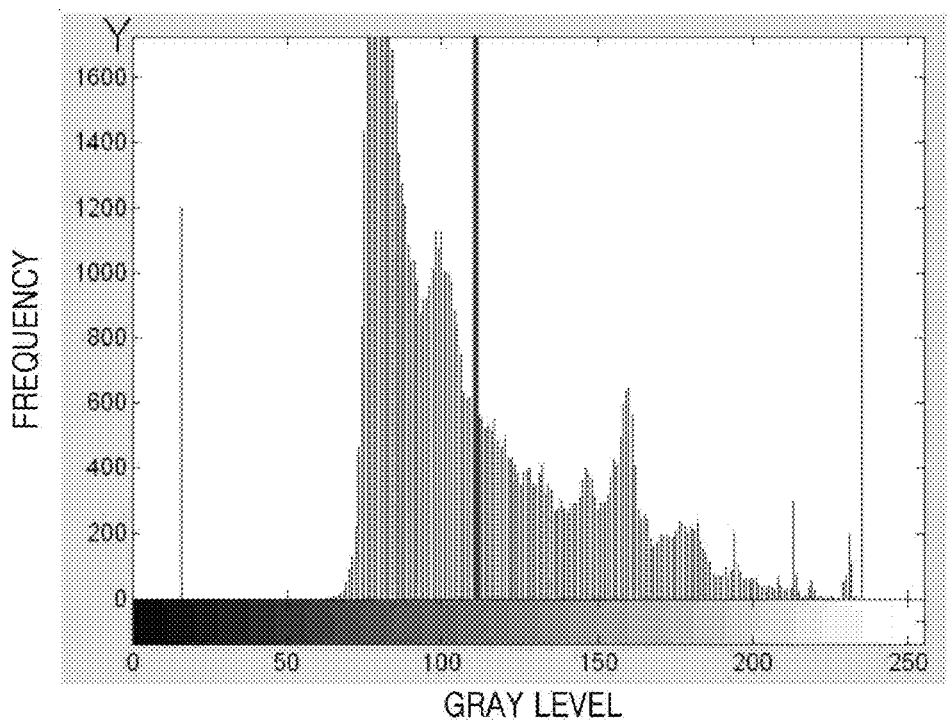
Figure 3C:

FIG. 3A is a photographic image captured on a sunny day and FIG. 3C is a photographic image captured on a foggy day.

Figure 3D:
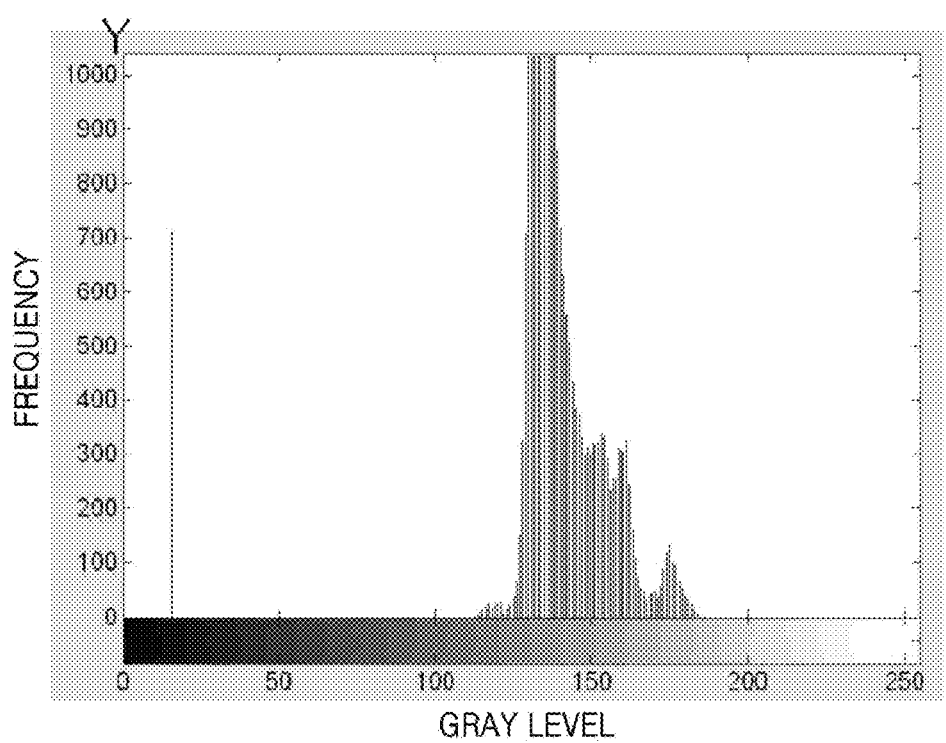

FIG. 3B is a histogram for analyzing the luminance of the photographic image of FIG. 3A and FIG. 3D is a histogram for analyzing the luminance of the photographic image of FIG. 3C.

In general, a foggy image looks blurred because overall brightness is increased and, a pixel has a slight luminance difference from neighboring pixels due to fog, which means that the distribution of luminance between pixels is reduced as shown in FIGS. 3B and 3D.

Each of a plurality of vertical lines indicated on the histograms illustrated in FIGS. 3B and 3D represents the number of pixels at each luminance value. Most of the lines indicated in FIG. 3D are arranged further to the right in comparison to the lines indicated in FIG. 3B, which shows how the average luminance of a foggy image is larger than the average luminance of a clear image. Also, the lines indicated in FIG. 3D are arranged in a more narrow range than the lines indicated in FIG. 3B, which means the distribution or range of different luminances in a foggy image is smaller than the distribution of a clear image (which includes both light areas, dark areas, and more in between).

The airlight map generator 120 illustrated in FIG. 1 uses a ratio between an average luminance of a luminance image, and a standard deviation in order to more accurately reflect variations of images. According to Weber's law, the human eye senses logarithmic changes in brightness. On a logarithmic scale from dark to bright, a slight variation in luminance on a dark region of an image is more easily recognizable than the same slight variation in luminance on a bright region of the image. In other words, since an overall luminance of a foggy image is high, a luminance variation cannot be easily recognized by human eyes. Thus, differently from an existing fog influence modeling method that separately considers an average luminance and a standard deviation, according to the current embodiment of the present invention, the influence of fog on the luminance of an image may be more accurately reflected in consideration of a ratio between an average luminance and a standard deviation.

Figure 2:
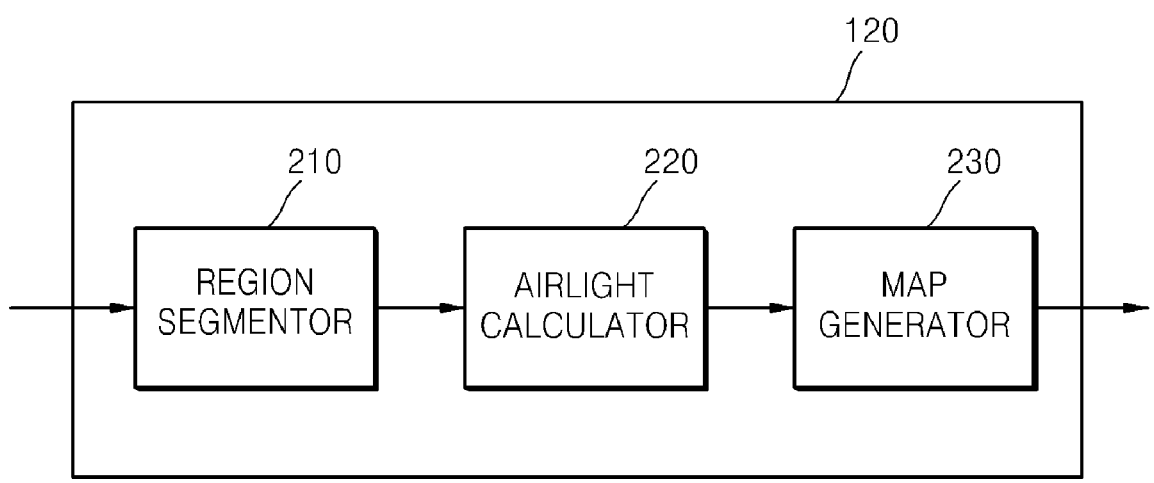
FIG. 2 is a block diagram of an airlight map generator illustrated in FIG. 1, according to an embodiment of the present invention.
Figure 4A:
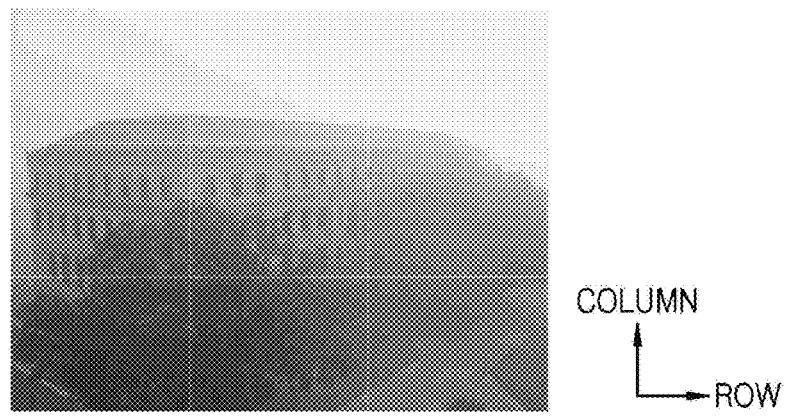
FIGS. 4A through 4C are diagrams for describing functions of the airtight map generator illustrated in FIG. 2, according to an embodiment of the present invention.
Figure 4B:
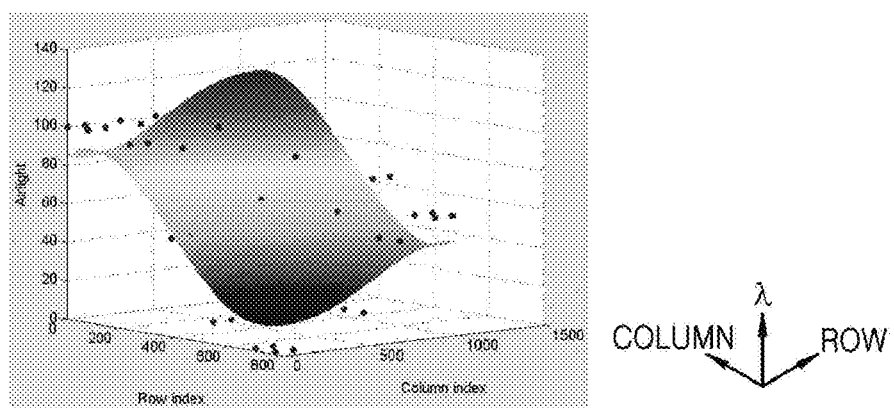
Figure 4C:
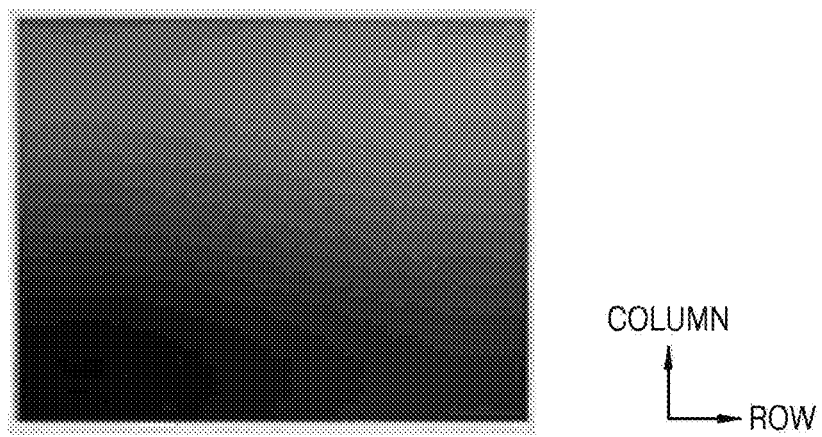

FIG. 2 is a block diagram of the airlight map generator 120 illustrated in FIG. 1, according to an embodiment of the present invention. FIGS. 4A through 4C are diagrams for describing functions of the airlight map generator 120 illustrated in FIG. 2, according to an embodiment of the present invention.

Referring to FIG. 2, the airlight map generator 120 includes an region segmentor 210, an airtight calculator 220, and a map generator 230.

The region segmentor 210 receives a first luminance image Y' and segments the first luminance image Y' into a plurality of regions having the same size in order to compensate for fog components in consideration of the influence of uneven fog. The number of regions may be arbitrarily and appropriately determined in consideration of complexity of hardware. For example, as shown in FIG. 4A, a certain image may be segmented into 9 blocks.

The airlight calculator 220 defines a cost function by using a ratio between an average luminance of the first luminance image Y', and a standard deviation, with respect to each of the regions obtained by the region segmentor 210, and calculates an airtight component of each region by using the cost function. Here, as described above with reference to FIG. 1, the ratio of the average luminance and the standard deviation is used to reflect the influence of fog. The cost function is a tool for finding an optimal solution and is defined as Equation 2.

$$A(\lambda) = \left[\frac{STD(Y'(i,j)-\lambda)}{MEAN(Y'(i,j)-\lambda)}\right] \quad (2)$$

$$B(\lambda) = \left[\frac{MEAN(Y'(i,j)-\lambda)}{MEAN(I(i,j))}\right] \times \left[\frac{STD(I(i,j))}{MEAN(I(i,j))}\right]$$

$$= [(MEAN(Y'(i,j)-\lambda)] \times \left[\frac{STD(I(i,j))}{MEAN(I(i,j))^2}\right]$$

According to the current embodiment of the present invention, as shown in Equation 2, cost functions $A(\lambda)$ and $B(\lambda)$ are used. However, the cost function is not limited to the cost functions $A(\lambda)$ and $B(\lambda)$ and other cost functions that use the ratio of the average luminance and the standard deviation in order to reflect the influence of fog may also be used.

Here, Y'(i,j) represents a luminance component of an image including airtight and I(i,j) represents a luminance component of an image not including airtight components, for example, a luminance component of an image captured in sunny weather, or a luminance component of an ideal image. The ideal image is an image that uses an entire color range, has an average luminance of (maximum value-minimum value)/2, and has a uniform distribution. The coordinates (i,j) locate a pixel and $\lambda$ is a degree of luminance to be subtracted from an image, i.e., an airtight component.

Equation 3 is used to calculate the airtight component $\lambda$ that has influenced an image, by using the cost functions $A(\lambda)$ and $B(\lambda)$.

$$\lambda_{Y(i,j)} = \arg\min(|A(\lambda)-B(\lambda)|) \quad (3)$$

The airlight component A that minimizes a difference between the cost functions $A(\lambda)$ and $B(\lambda)$ may be calculated by using Equation 3. Here, airtight components of the blocks illustrated FIG. 4A are calculated as shown in FIG. 4B. However, although an image is segmented into 9 blocks in FIG. 4A, airtight components of an image that is segmented into 25 blocks are indicated as dots in FIG. 4B.

The map generator 230 generates an airtight map with respect to the first luminance image Y' that is an entire luminance image by performing a least squares method on the airtight components of the regions. Here, correlations between the airtight components and coordinates of an image may be modeled by using the least squares method. Then, each dot that represents the airtight component $\lambda$ which is to be compensated for, is modeled as a coordinate of the image and the airlight map is generated with respect to an entire image by using an interpolation method. The least squares method is an efficient estimation method in a linear statistical model, and is well known. Thus, detailed descriptions of the least squares method will be omitted here. Also, the present invention is not limited to the least squares method and other interpolation methods of estimating a value between a plurality of coordinates may also be used.

Here, the airlight map with respect to the entire image is illustrated in FIG. 4C. As shown in FIG. 4C, airtight components to be compensated for are not equal but differ based on portions of the image. Referring to FIGS. 4A and 4C, fog is thick on a top right portion of the image illustrated in FIG. 4A and a top right portion of the airtight map illustrated in FIG. 4C is bright. Also, fog is thin on a bottom left portion of the image illustrated in FIG. 4A and a bottom left portion of the airlight map illustrated in FIG. 4C is dark.

Referring back to FIG. 1, the subtracter 130 subtracts the airlight map generated by the airlight map generator 120 from the first luminance image Y' output from the Y/C converter 110, and outputs a second luminance image Y".

The second luminance image Y" may be represented as Equation 4.

$$Y''(i,j)=Y'(i,j)-\lambda_Y(i,j) \quad (4)$$

Here, Y'(i,j) represents a luminance component of the first luminance image Y', which is distorted due to fog, $\lambda_Y(i,j)$ represents an airtight component that represents a degree of distortion caused by fog, and Y" (i,j) represents a luminance component of the second luminance image Y", in which distortion caused by fog is corrected.

The edge enhancer 140 performs edge enhancement on the second luminance image Y" output from the subtracter 130. Edges of a foggy image become vague due to the airlight such that the foggy image is blurred. In order to solve this problem, edge components are enhanced. Edge enhancement is performed according to Equation 5.

$$Y_{out(i,j)}=Y''(i,j)\pm s\times g(i,j) \quad (5)$$

Here, $Y_{out(i,j)}$ represents a luminance image on which fog distortion correction and edge enhancement are performed, s represents a parameter for controlling a degree of edge enhancement, and g(i,j) represents an edge component that is passed through a high pass filter. The high pass filter for edge enhancement may be a Gaussian high pass filter. However, the high pass filter is not limited to the Gaussian high pass filter and various other high pass filters may also be used.

The RGB converter 150 converts a luminance image $Y_{out}$ output from the edge enhancer 140 and the chrominance image C output from the Y/C converter 110, into an RGB image. Conversion from the RGB color space to the YCbCr color space is performed according to Equation 6.

$$R=1.164(Y-16)+1.596(Cr-128)$$

$$G=1.164(Y-16)-0.813(Cr-128)-0.392(Cb-128)$$

$$B=1.164(Y-16)+2.017(Cb-128) \quad (6)$$

The post-processor 160 receives the RGB image from the RGB converter 150 and performs histogram stretching on the RGB image as a post-processing procedure for preventing a phenomenon whereby an image on which a fog removal algorithm is executed by performing a subtracting operation, generally looks dark. Histogram stretching may be performed by extending a range between a minimum value and a maximum value of a histogram of the RGB image into a maximum range that can be represented by an image device. Each of 8-bit red, green, and blue (RGB) channels is extended to a range from a value 0 to a value 255.

Figure 5A:
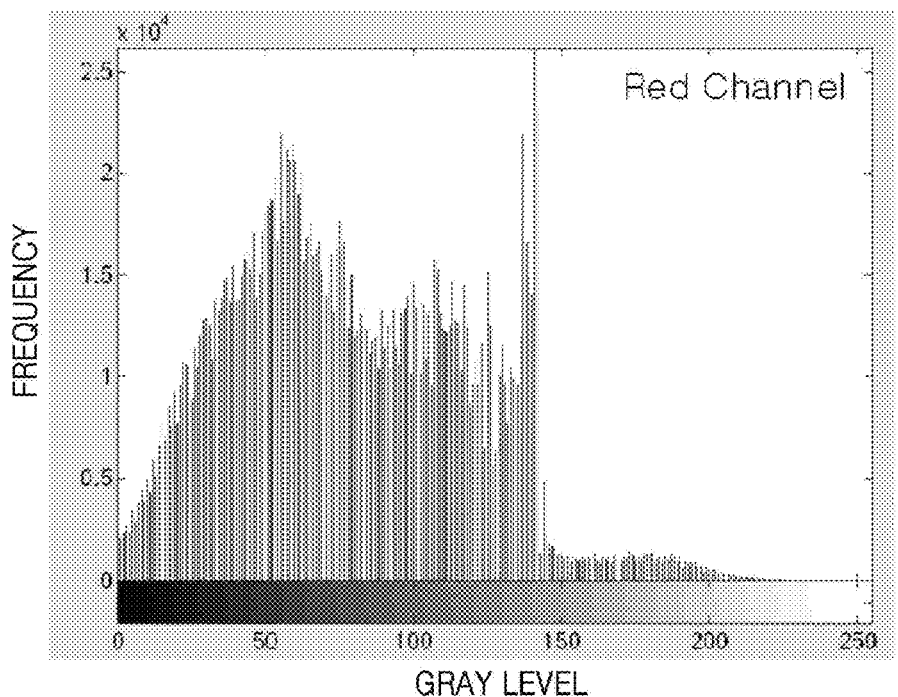
FIGS. 5A and 5B are diagrams for describing functions of a post-processor illustrated in FIG. 1, according to an embodiment of the present invention.
Figure 5B:
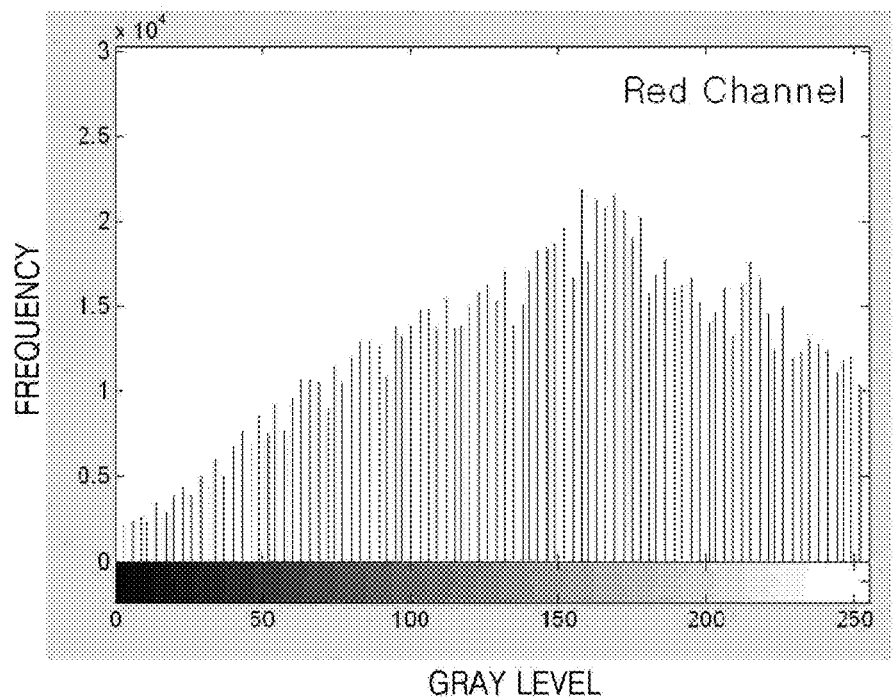

FIGS. 5A and 5B are diagrams for describing functions of the post-processor 160 illustrated in FIG. 1, according to an embodiment of the present invention.

FIG. 5A shows a histogram of an RGB image and FIG. 5B shows a result of performing histogram stretching. As shown in FIG. 5A, due to a subtracting operation, brightness of the RGB image is generally low. Also, if a foggy image is captured at dawn or in the evening, the foggy image is originally dark and becomes even darker after the subtracting operation is performed such that a subject can be unidentifiable. Thus, in this case, histogram stretching is performed such that distribution of luminance becomes uniform from a value 0 to a value 255. However, the present invention is not limited to histogram stretching and other post-processing methods may also be used to compensate for a dark image.

Figure 6:
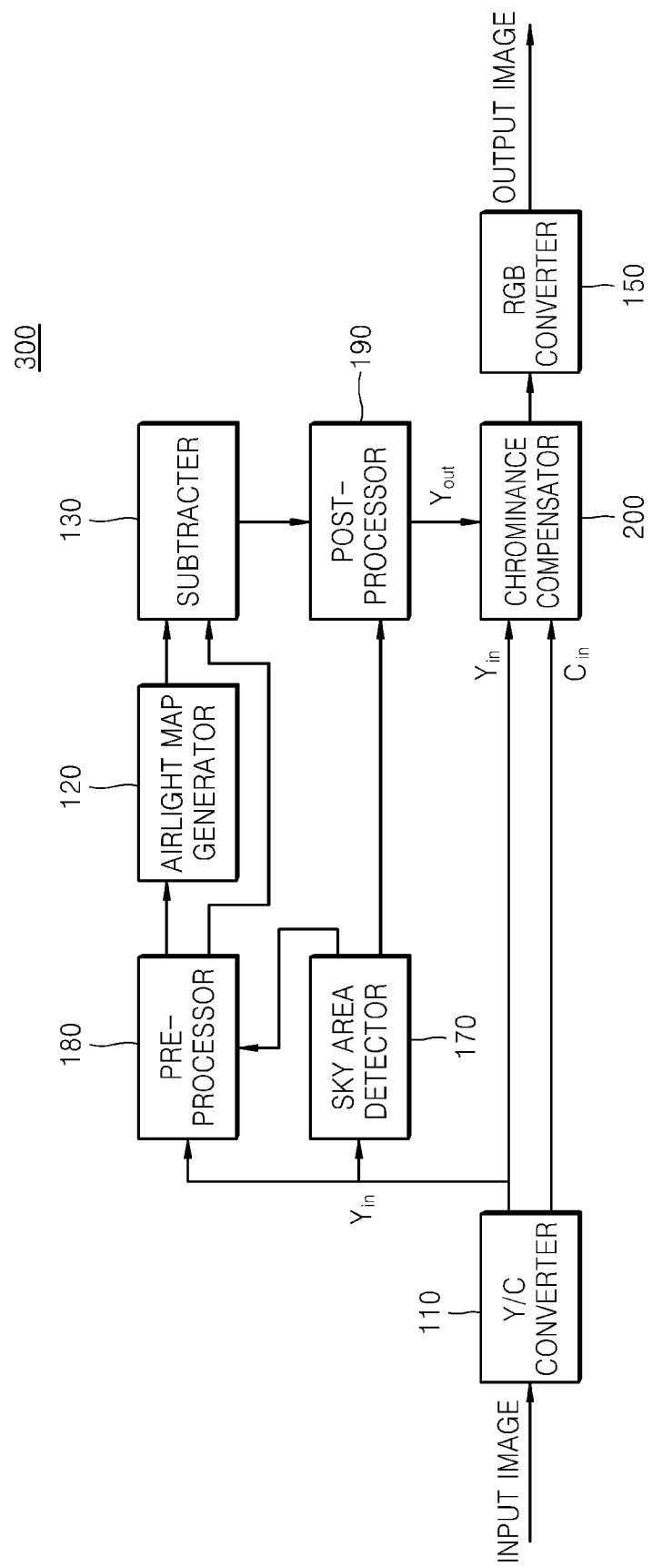
FIG. 6 is a block diagram of an image processing apparatus according to another embodiment of the present invention.

FIG. 6 is a block diagram of an image processing apparatus 300 according to another embodiment of the present invention.

Referring to FIG. 6, the image processing apparatus 300 includes a Y/C converter 110, an airlight map generator 120, a subtracter 130, an RGB converter 150, a sky region detector 170, a pre-processor 180, a post-processor 190, and a chrominance compensator 200. The same elements as those of the image processing apparatus 100 illustrated in FIG. 1 will be omitted and only different elements will be described here.

The sky region detector 170 receives a luminance image $Y_{in}$ from the Y/C converter 110 and detects a sky region by using edge components of the luminance image $Y_{in}$. Here, edge detection is performed by using a gradient image of the luminance image $Y_{in}$.

The sky region has a uniform distribution and thus is not identified from a thick foggy region when a fog distortion correction method is performed by using an average luminance and distribution. Accordingly, when image enhancement is performed on an image including the sky region, over-enhancement can occur. Therefore, the sky region is excluded when the airtight is estimated. According to the current embodiment of the present invention, characteristics of a foggy image are used to detect the sky region. The sky region is generally located on an upper portion of an image and the sky region of a foggy image does not have edge components. Edge detection is performed by using the gradient image of an image in order to detect the sky region. Each row is scanned in a direction from the top to the bottom of columns. If an edge is detected, previous pixels of the edge are detected as the sky region. For example, a Laplacian mask is used as an edge detection method. A Laplacian edge detector has a very fast speed by using only one mask and can perform edge detection in all directions by using a secondary differential operator. In order to detect the edge by using a mask, pixels of an original image are respectively multiplied by corresponding pixels of the mask and all multiplied pixels are summed and allocated to a center pixel. Also, after the sky region is detected, a luminance representation range of the sky region is calculated by using a ratio of the sky region with respect to an overall image, and maximum and minimum luminance values in the sky region.

The edge detection method is not limited to the Laplacian mask and other edge detection methods may also be used.

The pre-processor 180 extends a luminance representation range of a non-sky region by using the luminance image $Y_{in}$ input from the Y/C converter 110 and the sky region detected by the sky region detector 170, and readjusts luminance of the non-sky region by using a histogram.

FIGS. 7A through 7D are diagrams for describing operation of the pre-processor 180 illustrated in FIG. 6, according to an embodiment of present invention.

Figure 7A:
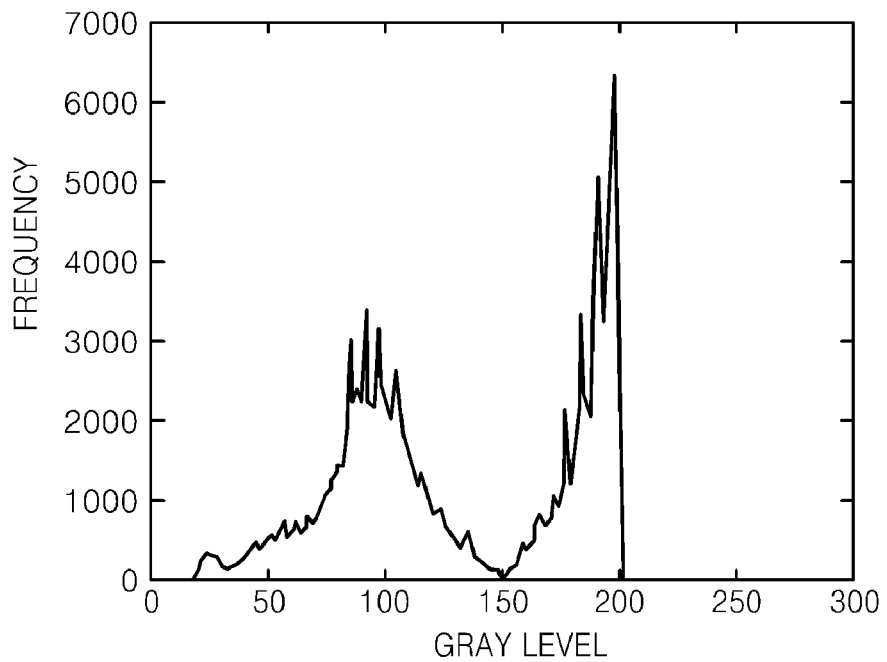
FIGS. 7A through 7D are diagrams for describing operation of a pre-processor illustrated in FIG. 6, according to an embodiment of present invention.
Figure 7B:
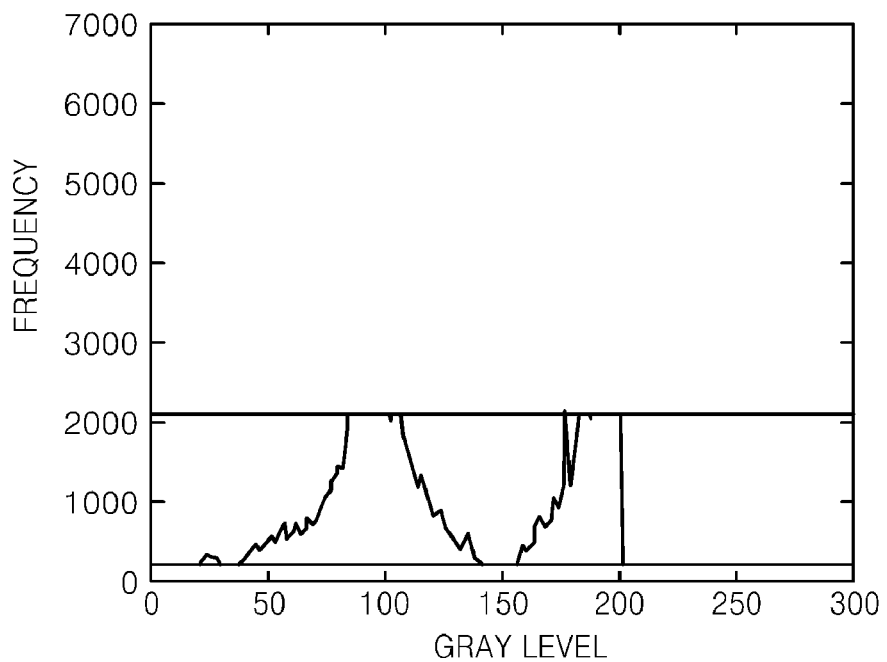
Figure 7C:
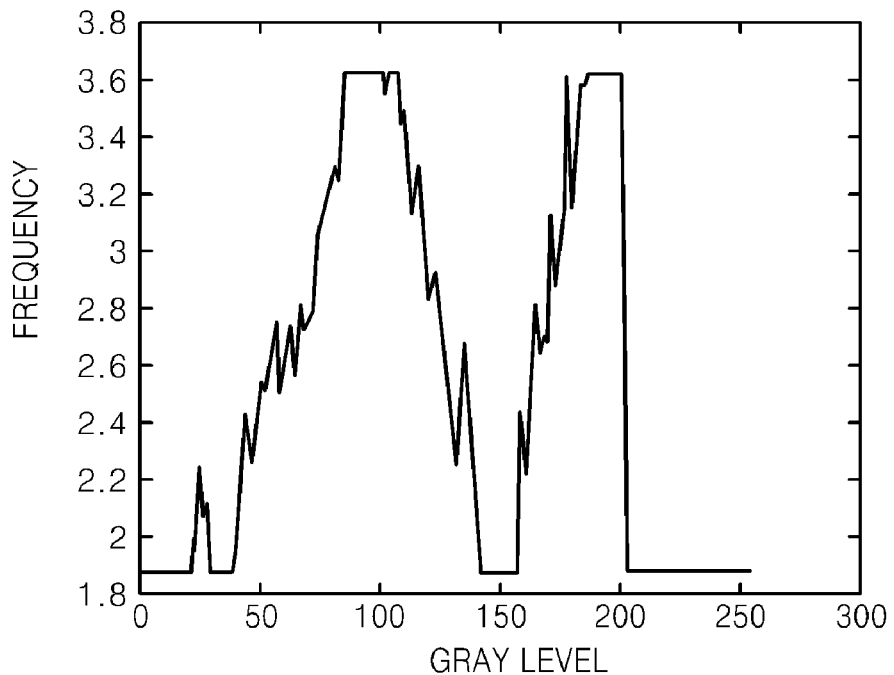

Referring to FIGS. 7A through 7D, the pre-processor 180 extracts a histogram of an input luminance image excluding a sky region. FIG. 7A illustrates the histogram of the input luminance image. Then, heights of the histogram are restricted at a rate of a predetermined percentage of a total number of pixels in the input luminance image. The histogram of which the heights are restricted is illustrated in FIG. 7B.

Then, differences in the heights of the histogram are reduced while an envelope of the histogram is maintained, by using an exponent operation such as Equation 7.

$$h_{new}(k)=(h(k)+1)^{1/n} \quad (7)$$

Here, h(k) represents a histogram, k represents a luminance representation range, and n represents a constant of an exponent.

An accumulated histogram is generated by accumulating modified histogram values, and then, a mapping function is generating by varying a luminance representation range.

Figure 7D:
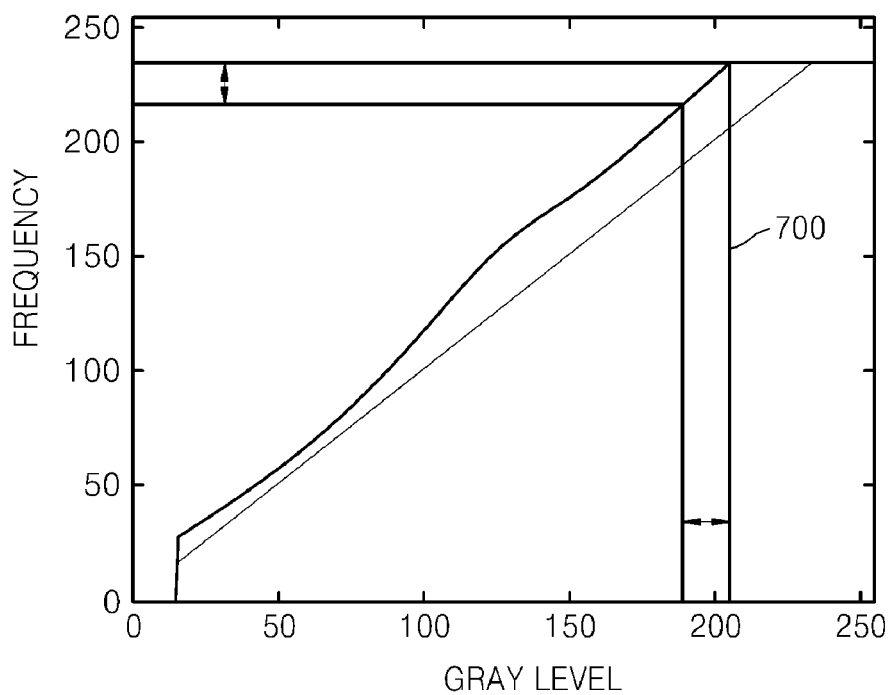

Here, a luminance representation range of the sky region is controlled to not be varied. The mapping function is illustrated in FIG. 7D Referring back to FIG. 6, the airtight map generator 120 generates an airtight map from a pre-processed luminance image. Here, the pre-processed luminance image is an image in which a luminance representation range of a non-sky region from which fog components are to be removed is controlled while a range from a maximum luminance value to a minimum luminance value of a sky region is maintained.

Figure 8:
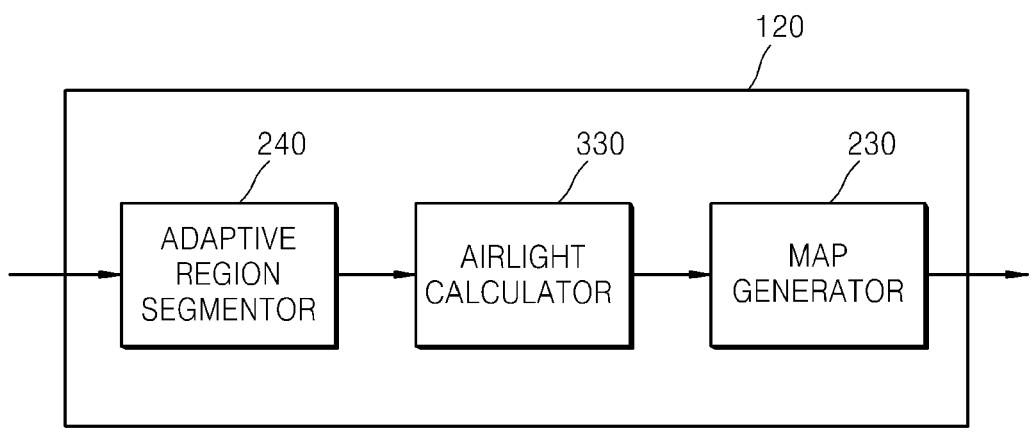
FIG. 8 is a block diagram of an airtight map generator illustrated in FIG. 6, according to an embodiment of the present invention.

FIG. 8 is a block diagram of the airtight map generator 120 illustrated in FIG. 6, according to an embodiment of the present invention.

Referring to FIG. 8, the airlight map generator 120 includes an adaptive region segmentor 215, an airlight calculator 220, and a map generator 230.

The airlight map generator 120 according to the current embodiment of the present invention is different from the airtight map generator 120 illustrated in FIG. 2 in that the adaptive region segmentor 215 is included. The region segmentor 210 illustrated in FIG. 2 does not consider pixels having different depths in the same region. Here, a depth means a difference from a camera to a subject. In general, airtight in a foggy environment is represented as a function regarding the difference between the subject and the camera. In more detail, the region segmentor 210 illustrated in FIG. 2 calculates the airlight by using a cost function based on each region. Thus, if pixels in the same region have big differences in depth, a resultant image can appear unnatural. For example, a halo effect can occur where pixels have big differences in depth in the same region, or compensation information can be differently estimated due to surrounding factors such that the same building or object can have different brightnesses.

The adaptive region segmentor 215 illustrated in FIG. 8 adaptively segments an input image into a plurality of regions based on distances between objects in the input image. In more detail, distances between objects that are photographed are estimated and the input image is segmented into a plurality of uneven regions by reflecting the estimated distances.

FIGS. 9A through 9E are diagrams for describing operation of the adaptive region segmentor 215 illustrated in FIG. 8, according to an embodiment of present invention.

Referring to FIGS. 9A through 9E, initially, region division is performed in order to estimate airtight in each region. An original image is segmented into a plurality of even regions. Region re-division is performed by using a gradient image in order to estimate each region in the original image at the same depth. In more detail, a gradient image is generated from each region and gradient values are summed in each of row and column directions. Region re-division is performed by using a pixel having a maximum gradient value with respect to the row and column directions of each region, as a division point.

Figure 9A:
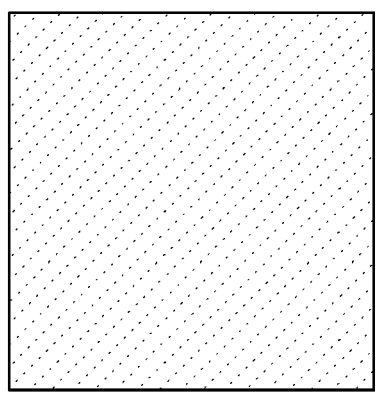
FIGS. 9A through 9E are diagrams for describing operation of an adaptive region segmentor illustrated in FIG. 8, according to an embodiment of present invention.
Figure 9B:
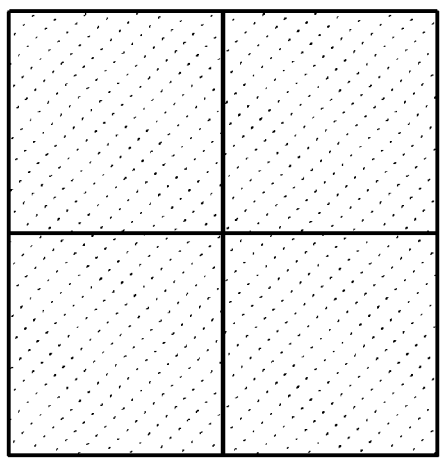
Figure 9C:
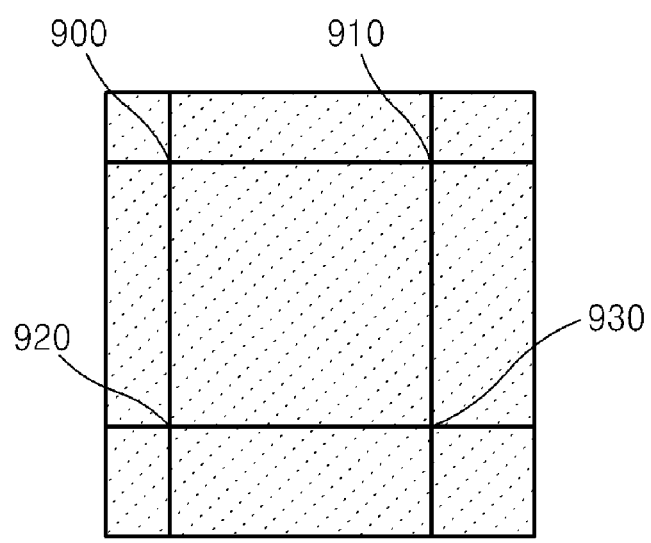

For example, in order to segment the original image into 9 (3×3) regions, the original image is initially segmented into even 2×2 regions in the row and column directions (see FIG. 9B). Then, gradient values are summed in the row and column directions. In more detail, the gradient values are summed according to Equation 8 with respect to each of the even regions.

$$S_{row}(j, k) = \sum_{j=1}^{n_{col}} G(i, j, k) \quad i = 1, 2, \ldots, n_{row} \quad (8)$$

$$S_{col}(j, k) = \sum_{i=1}^{n_{row}} G(i, j, k) \quad j = 1, 2, \ldots, n_{col}$$

Here, $n_{row}$ and $n_{col}$ respectively represent the numbers of rows and columns in an region, G(i,j) represents a gradient image of a corresponding region, and k (here, k=1, 2, 3, or 4) represents an index of the region.

A coordinate corresponding to a maximum gradient sum of each region is selected in the row and column directions. In more detail, a coordinate having maximum values of $S_{row}$ and $S_{col}$ is calculated in each region (see 900, 910, 920, and 930 indicated in FIGS. 9C and 9D). The coordinate may be calculated according to Equation 9.

$$x_{block}(k) = \max_i S_{row}(i, k), \; y_{block}(k) = \max_j S_{col}(j, k) \quad (9)$$

Figure 9D:
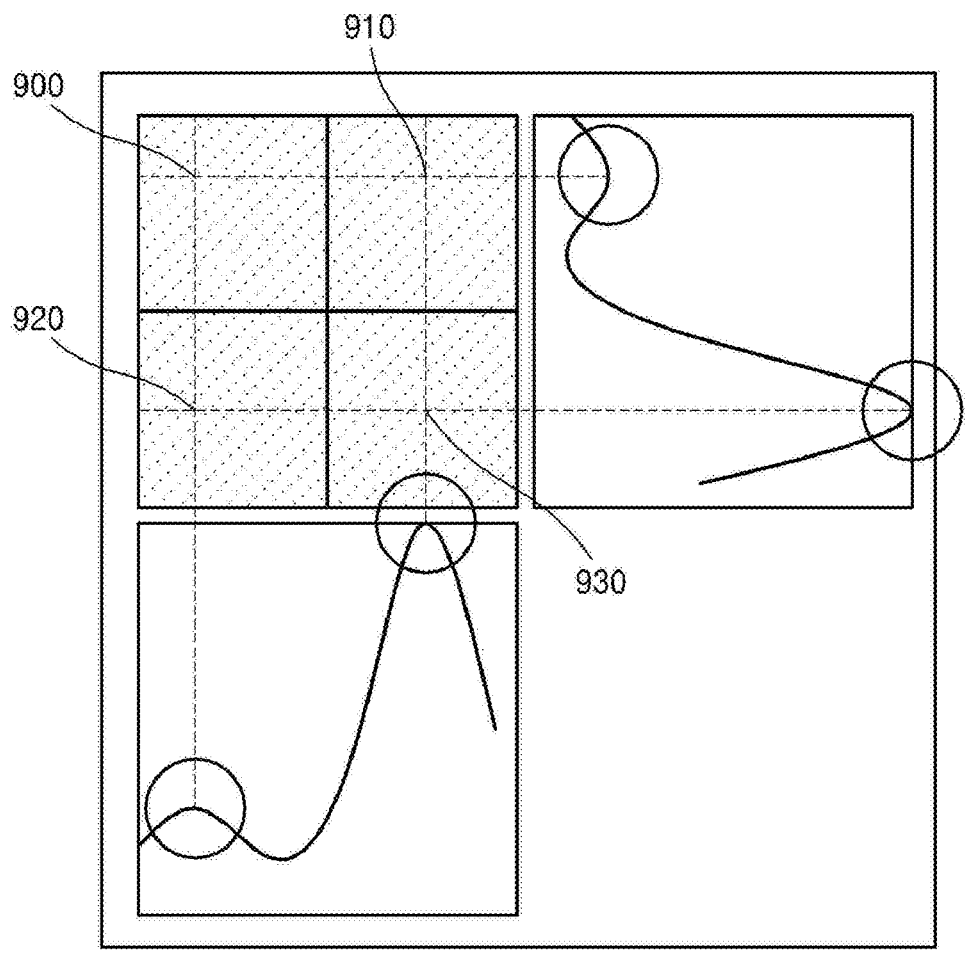
Figure 9E:
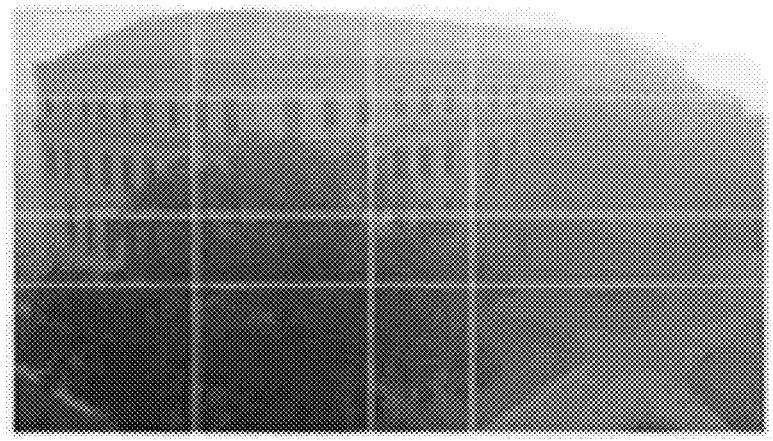

Then, region re-division is performed (see FIG. 9D). A result of adaptively segmenting the original image is illustrated in FIG. 9E.

Referring back to FIG. 8, the airtight calculator 220 calculates an airtight component required for fog removal compensation, i.e., a degree of required fog removal compensation, by using a cost function with respect to each of the uneven regions that are obtained by the adaptive region segmentor 215.

The map generator 230 generates an airlight map for compensating an overall image by interpolating the airtight component calculated by the airtight calculator 220 for each region, with respect to the overall image.

Referring back to FIG. 6, the post-processor 190 performs post-processing by using a luminance image from which fog components are removed, which is received form the subtracter 130, and the sky region received from the sky region detector 170. Here, post-processing is performed by compensating for luminance reduction of an overall image, which is caused by fog distortion correction based on a subtracting operation, and restoring loss of edge information, which is caused by fog.

Figure 10:
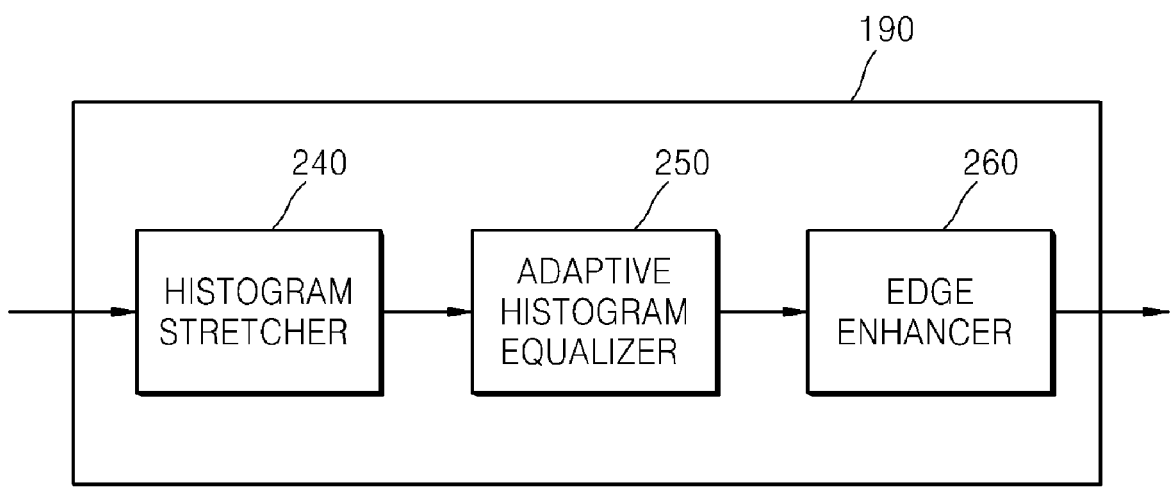
FIG. 10 is a block diagram of a post-processor illustrated in FIG. 6, according to an embodiment of the present invention.

FIG. 10 is a block diagram of the post-processor 190 illustrated in FIG. 6, according to an embodiment of the present invention.

Referring to FIG. 10, the post-processor 190 includes a histogram stretcher 240, an adaptive histogram equalizer 250, and an edge enhancer 260

The histogram stretcher 240 controls a luminance representation range of a non-sky region so that an average luminance of the non-sky region after fog distortion correction is performed, is the same as that before fog distortion correction is performed, by using a sky region received form the sky region detector 170 illustrated in FIG. 6.

The adaptive histogram equalizer 250 extends the luminance representation range of the non-sky region by using the sky region, which is received form the sky region detector 170, and readjusts luminance of the non-sky region by using a histogram. The operation of the adaptive histogram equalizer 250 is the same as that of the pre-processor 180 illustrated in FIG. 6.

The edge enhancer 260 performs edge enhancement on a luminance image output from the adaptive histogram equalizer 250. Edges of a foggy image become vague due to airtight such that the foggy image is blurred. In order to solve this problem, edge components are enhanced. Here, edge enhancement is performed as described above with reference to Equation 5.

Referring back to FIG. 6, the chrominance compensator 200 performs chrominance compensation by using the luminance image $Y_{in}$ and a chrominance image $C_{in}$ which are input from the Y/C converter 110 and a luminance image $Y_{out}$ input from the post-processor 190. Here, chrominance compensation is performed in order to compensate for the influence of the airtight and thus chrominance reduction caused by a luminance variation is compensated for. Chrominance compensation is performed according to Equation 10.

$$C_{out} = c_p \times \frac{Y_{out}}{Y_{in}} \times (C_{in} - C_{mid}) + C_{mid} \quad (10)$$

Here, $C_p$ represents a saturation compensation constant, $C_{mid}$ represents an intermediate value of chrominance components, $Y_{in}$ and $C_{in}$ respectively represent a luminance image and a chrominance image of a foggy image, and $Y_{out}$ and $C_{out}$ respectively represent a luminance image and a chrominance image of an image in which fog distortion is corrected.

The RGB converter 150 receives the luminance image $Y_{out}$ and a chrominance image $C_{out}$ of which chrominance components are compensated for, from the post-processor 190, and outputs an RGB image. Conversion from a YCbCr color space to an RGB color space is performed according to Equation 6.

Figure 11:
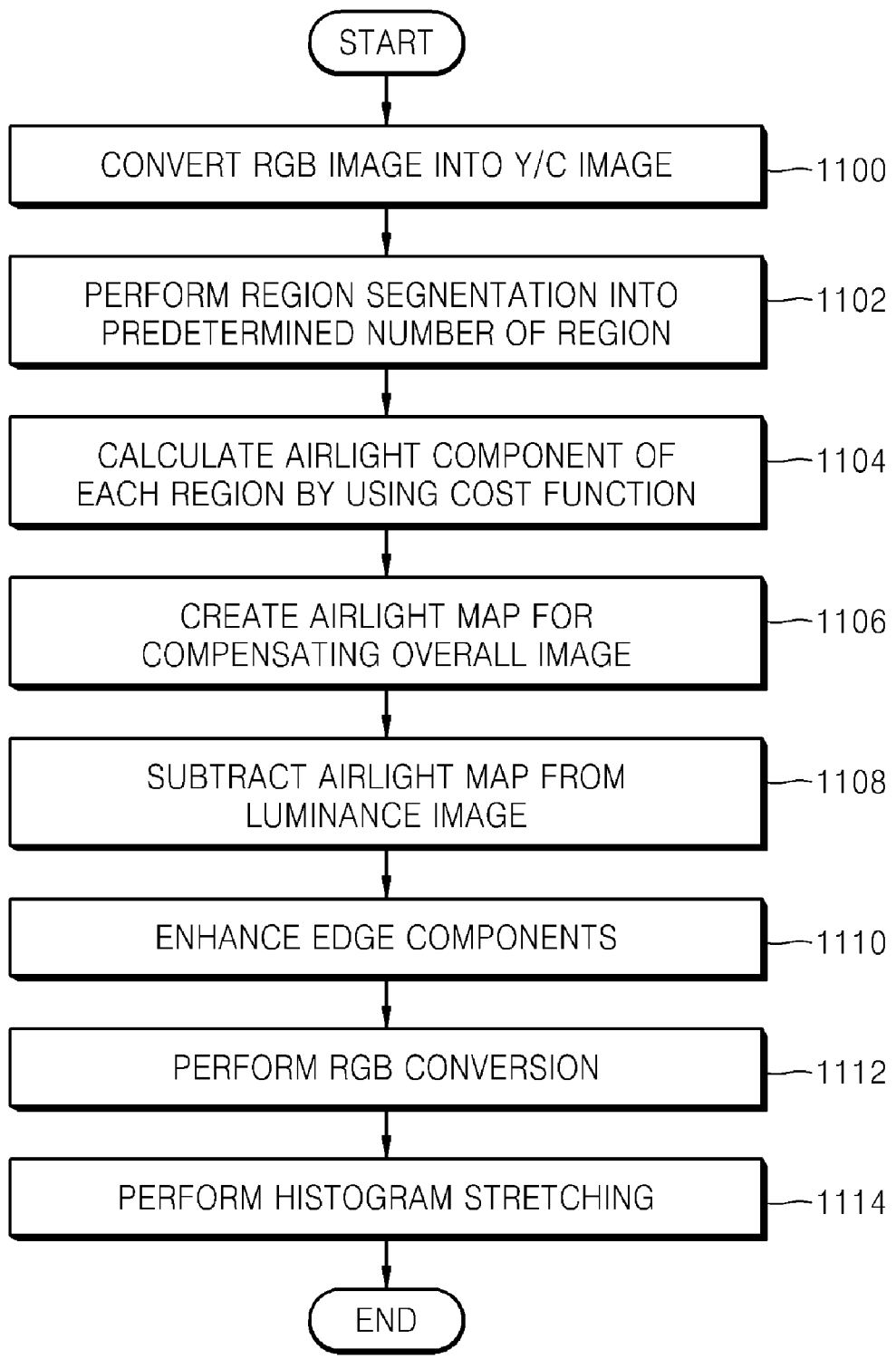
FIG. 11 is a flowchart of an image processing method according to an embodiment of the present invention.

FIG. 11 is a flowchart of an image processing method according to an embodiment of the present invention.

Referring to FIG. 11, in operation 1100, an RGB image is converted into a Y/C image including a luminance and chrominance image. In operation 1102, the luminance image is segmented into a predetermined number of regions. In operation 1104, an airtight component of each region is calculated by using a cost function, and, in operation 1106, an airtight map for compensating an overall image is generated. In operation 1108, the airtight map is subtracted from the luminance image and thus airlight components are removed from the luminance image. In operation 1110, edge components are enhanced in order to prevent the edge components from being reduced due to airtight. In operation 1112, RGB conversion is performed by using the chrominance image and the luminance image from which the airtight components are removed and in which the edge components are enhanced, thereby outputting an RGB image. In operation 1114, luminance reduction of the overall image is compensated for by performing histogram stretching.

Figure 12:
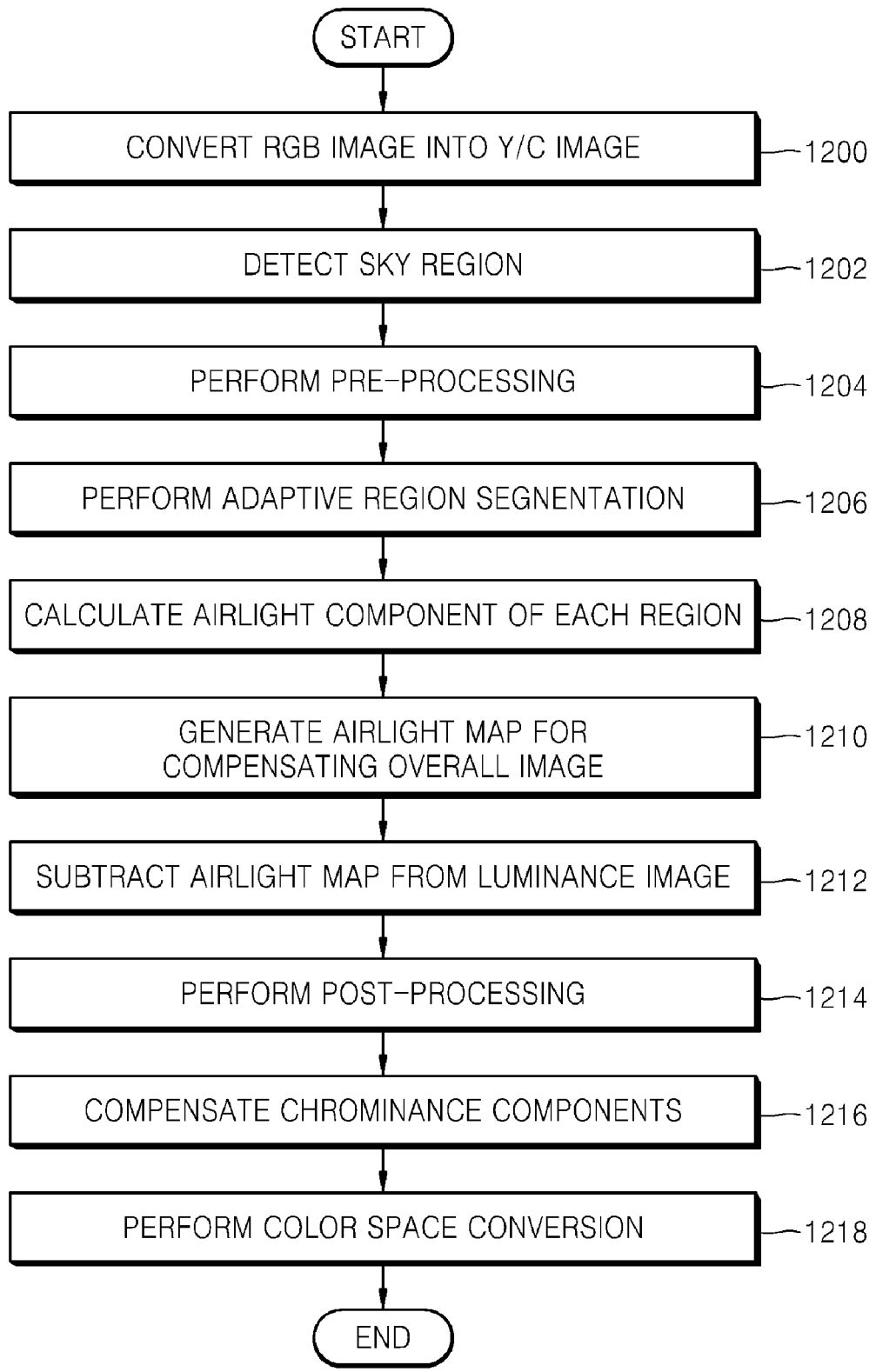
FIG. 12 is a flowchart of an image processing method according to another embodiment of the present invention.

FIG. 12 is a flowchart of an image processing method according to another embodiment of the present invention.

Referring to FIG. 12, in operation 1200, an RGB image is converted into a Y/C image including luminance and chrominance images. In operation 1202, a sky region is detected from the luminance image. Here, detection of the sky region is performed by searching for an edge component from the top of the luminance image and detecting previous pixels of the edge component as the sky region. Then, a luminance representation range of the sky region is calculated by using a ratio of the sky region with respect to an overall image, and maximum and minimum luminance values in the sky region. In operation 1204, pre-processing is performed by using the chrominance image and the sky region. Pre-processing is performed by extending a luminance representation range of a non-sky region and adjusting luminance of the non-sky region by using a histogram. Here, heights of the histogram are restricted and, particularly, differences in the heights of the histogram are reduced while an envelope of the histogram is maintained, by using an exponent operation. Then, a mapping function is generated while the luminance representation range of the sky region is maintained. In operation 1206, the luminance image is adaptively segmented into a plurality of regions in consideration of different depths of the luminance image. Here, adaptive region division is performed by using gradient images. In operation 1208, an airtight component of each region is calculated by using a cost function, and, in operation 1210, an airlight map for compensating an overall image is generated. In operation 1212, the airtight map is subtracted from the luminance image and thus airlight components are removed from the luminance image. In operation 1214, post-processing is performed on the sky region and on the luminance image from which the airlight components are removed. Here, post-processing includes histogram stretching, adaptive histogram equalization in consideration of the sky region, and edge enhancement. In operation 1216, chrominance compensation is performed by using the original luminance image, the post-processed luminance image, and the chrominance image. Chrominance compensation is performed by compensating for saturation reduction caused by a luminance variation. In operation 1218, the post-processed luminance image and the chrominance-compensated chrominance image are converted into an RGB image.

FIGS. 13A through 13G are photographic images for showing a result of processing an image, according to an embodiment of the present invention.

Figure 13A:
FIGS. 13A through 13G are photographic images for showing a result of processing an image, according to an embodiment of the present invention.
Figure 13B:
Figure 13C:
Figure 13D:
Figure 13E:
Figure 13F:
Figure 13G:
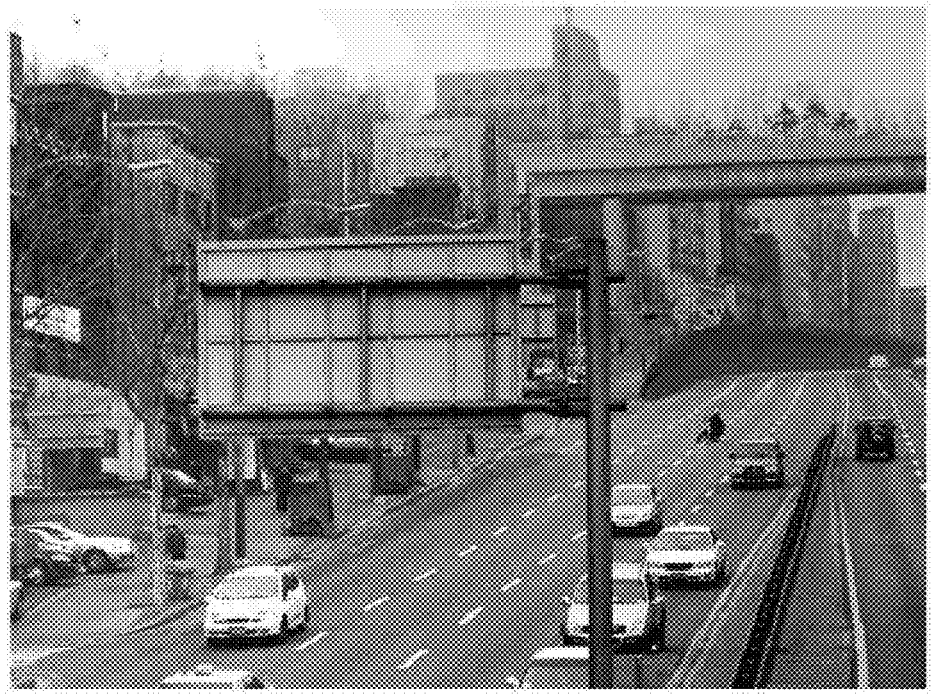

FIG. 13A shows an original image, FIG. 13B shows a luminance image of the original image, FIG. 13C shows a luminance image on which pre-processing is performed, FIG. 13D shows an airlight map represented in a gray level, FIG. 13E shows a luminance image on which distortion correction is performed by subtracting the airtight map of FIG. 13D from the luminance image of FIG. 13B, FIG. 13F shows a luminance image on which post-processing is performed, and FIG. 13G shows a final resultant image.

When FIGS. 13A and 13G are compared, distortion caused by fog is corrected.

The present invention can also be implemented as computer-readable code on a computer-readable recording medium. The computer-readable recording medium is any data storage device that can store data which can be thereafter read by a computer system.

Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed by programmers of ordinary skill in the art to which the present invention pertains.

As described above, according to the present invention, airtight components may be effectively removed by generating an airlight map based on a ratio between an average luminance of an image including airtight generated due to fog, and a standard deviation, and subtracting the airtight map from the image.

Also, the influence of, for example, a halo effect or luminance difference of the same object after fog distortion correction is performed, may be reduced by adaptively segmenting an image into a plurality of regions in consideration of depth difference of the image. Furthermore, fog components may be effectively removed from a foggy image captured at dawn or in the evening, by estimating a degree of required fog compensation after luminance of a non-sky region is compensated in a pre-processing operation.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. An image processing method comprising:
    receiving a first luminance image of an image including airlight and generating an airlight map based on a ratio between an average luminance of the first luminance image, and a standard deviation, wherein the generating of the airlight map comprises:
        segmenting the first luminance image into a predetermined number of regions;
        defining a cost function by using the ratio between the average luminance of the first luminance image, and the standard deviation, with respect to each region, and calculating an airlight component of each region by using the cost function; and
        generating the airlight map of the first luminance image by performing a least squares method on airlight components of the regions;
    the method further comprising:
        removing the airlight by subtracting the airlight map from the first luminance image and outputting a second luminance image.

2. The method of claim 1, wherein the airlight map represents a degree of influence of the airlight on the image.

3. The method of claim 1, wherein the segmenting of the first luminance image is adaptively performed based on a depth difference of the first luminance image.

4. The method of claim 1, wherein the segmenting of the first luminance image comprises summing gradient values in row and column directions of the first luminance image and segmenting the first luminance image with reference to coordinates having maximum sums of the gradient values.

5. The method of claim 1, further comprising detecting a sky region by using edge information of the first luminance image before segmenting the first luminance image.

6. The method of claim 5, further comprising performing pre-processing on the first luminance image by extending a luminance representation range of a non-sky region obtained by excluding the sky region from the first luminance image, adjusting luminance of the non-sky region by using a histogram, and generating a mapping function which represents the luminance representation range, by accumulating values of the histogram.

7. The method of claim 6, wherein the performing of pre-processing comprises adjusting the luminance according to Equation 7:

$$h_{new}(k) = (h(k)+1)^{1/n} \quad (7);$$

wherein
h(k) represents a histogram,
k represents a luminance representation range, and
n represents a constant of an exponent.

8. The method of claim 7, wherein the mapping function maintains the luminance representation range of the sky region.

9. The method of claim 7, further comprising performing post-processing by compensating for luminance reduction in the second luminance image.

10. The method of claim 9, further comprising compensating for saturation reduction caused by a luminance variation of the image including the airlight by using the first luminance image and a first chrominance image of the image, and by using the second luminance image on which post-processing is performed.

11. The method of claim 1, wherein the cost function is calculated based on the following Equation 2:

$$A(\lambda) = \left[\frac{STD(Y'(i,j)-\lambda)}{MEAN(Y'(i,j)-\lambda)}\right] \quad (2)$$

$$B(\lambda) = \left[\frac{MEAN(Y'(i,j)-\lambda)}{MEAN(I(i,j))}\right] \times \left[\frac{STD(I(i,j))}{MEAN(I(i,j))}\right]$$

$$= [(MEAN(Y'(i,j)-\lambda)] \times \left[\frac{STD(I(i,j))}{MEAN(I(i,j))^2}\right]$$

wherein
Y'(i,j) represents a luminance component of an image including airlight,
I(i,j) represents a luminance component of an image not including airlight,
(i,j) is a coordinate of a pixel, and
λ is a degree of luminance to be subtracted from an image.

12. The method of claim 11, wherein the airlight component is calculated according to the following Equation 3:

$$\lambda_{Y(i,j)} = \arg\min(|A(\lambda)-B(\lambda)|) \quad (3).$$

13. The method of claim 1, wherein the airlight is a type of light that occurs in a foggy environment.

14. An image processing method comprising:
    receiving a first luminance image of an image including airlight and generating an airlight map based on a ratio between an average luminance of the first luminance image, and a standard deviation;
    removing the airlight by subtracting the airlight map from the first luminance image and outputting a second luminance image; and
performing edge enhancement on the second luminance image according to the following Equation 5:

$$Y_{out(i,j)} = Y''(i,j) \pm s \times g(i,j) \quad (5);$$

wherein
$Y_{out(i,j)}$ represents a luminance image on which fog distortion correction and edge enhancement are performed,
Y'' represents a second luminance image,
s represents a parameter for controlling a degree of edge enhancement, and
g(i,j) represents an edge component that is passed through a high pass filter.

15. The method of claim 14, further comprising:
    converting a chrominance image of the image including the airlight, and a third luminance image obtained by performing edge enhancement on the second luminance image, into an RGB image; and
    performing histogram stretching on the RGB image.

16. An image processing method comprising:
  receiving a first luminance image of an image comprising a foggy image and segmenting the first luminance image into a predetermined number of regions;
  calculating an airlight component of each region based on a ratio between an average luminance of the first luminance image, and a standard deviation;
  generating an airlight map of the first luminance image by performing a least squares method on airlight components of the regions; and
  removing an influence of the foggy image by subtracting the airlight map from the first luminance image and outputting a second luminance image.

17. The method of claim 16, wherein the segmenting of the first luminance image is adaptively performed based on a depth difference of the first luminance image.

18. The method of claim 17, before segmenting the first luminance image, further comprising:
  detecting a sky region by using edge information of the first luminance image; and
  performing pre-processing on the first luminance image by adjusting luminance of a non-sky region obtained by excluding the sky region from the first luminance image,
  wherein the segmenting of the first luminance image is adaptively performed based on depth information of the first luminance image on which pre-processing is performed.

19. The method of claim 16, wherein the airlight is a type of light that occurs in a foggy environment.

20. A non-transitory computer readable recording medium having recorded thereon a computer program for executing the method of claim 1.

21. An image processing apparatus comprising:
  an airlight map generator for receiving a first luminance image of an image including airlight and generating an airlight map based on a ratio between an average luminance of the first luminance image, and a standard deviation, wherein the airlight map represents a degree of influence of the airlight on the image and the airlight map generator comprises:
    a region segmentor for segmenting the first luminance image into a predetermined number of regions;
    an airlight calculator for defining a cost function by using the ratio between the average luminance of the first luminance image, and the standard deviation, with respect to each region, and calculating an airlight component of each region by using the cost function; and
    a map generator for generating the airlight map of the first luminance image by performing a least squares method on airlight components of the regions;
  the image processing apparatus further comprising:
    a subtracter for removing the airlight by subtracting the airlight map from the first luminance image and outputting a second luminance image.

22. The apparatus of claim 21, further comprising an edge enhancer for performing edge enhancement on the second luminance image output from the subtracter.

23. The apparatus of claim 22, further comprising:
  an RGB converter for converting a chrominance image of the image including the airlight, and a third luminance image output from the edge enhancer, into an RGB image; and
  a post-processor for performing histogram stretching on the RGB image.

24. The apparatus of claim 21, wherein the region segmentor adaptively segments the first luminance image based on a depth difference of the first luminance image.

25. The apparatus of claim 21, further comprising a sky region detector for detecting a sky region by using edge information of the first luminance image.

26. The apparatus of claim 25, further comprising a pre-processor for extending a luminance representation range of a non-sky region obtained by excluding the sky region from the first luminance image, adjusting luminance of the non-sky region by using a histogram, and generating a mapping function which represents the luminance representation range, by accumulating values of the histogram.

27. The apparatus of claim 26, further comprising a post-processor for compensating the second luminance image for luminance reduction.

28. The apparatus of claim 27, further comprising a chrominance compensator for compensating for saturation reduction caused by a luminance variation of the image including the airlight by using the first luminance image and a first chrominance image of the image, and the second luminance image on which post-processing is performed.

29. The apparatus of claim 21, wherein the airlight is a type of light that occurs in a foggy environment.

30. An image processing apparatus comprising:
  an airlight map generator for receiving a first luminance image of an image including airlight and generating an airlight map based on a ratio between an average luminance of the first luminance image, and a standard deviation, wherein the airlight map represents a degree of influence of the airlight on the image;
  a subtracter for removing the airlight by subtracting the airlight map from the first luminance image and outputting a second luminance image;
  a sky region detector for detecting a sky region by using edge information of the first luminance image; and
  a pre-processor for extending a luminance representation range of a non-sky region obtained by excluding the sky region from the first luminance image, adjusting luminance of the non-sky region by using a histogram, and generating a mapping function which represents the luminance representation range, by accumulating values of the histogram.

* * * * *